(12) United States Patent
Kuhn et al.

(10) Patent No.: US 8,594,992 B2
(45) Date of Patent: Nov. 26, 2013

(54) METHOD AND SYSTEM FOR USING ALIGNMENT MEANS IN MATCHING TRANSLATION

(75) Inventors: Roland Kuhn, Ottawa (CA); Cyril Goutte, Ottawa (CA); Pierre Isabelle, La Peche (CA); Michel Simard, Gatineau (CA)

(73) Assignee: National Research Council of Canada

( * ) Notice: Subject to any disclaimer, the term of this patent is extended or adjusted under 35 U.S.C. 154(b) by 398 days.

(21) Appl. No.: 12/996,717

(22) PCT Filed: Jun. 9, 2009

(86) PCT No.: PCT/CA2009/000810
§ 371 (c)(1),
(2), (4) Date: Dec. 7, 2010

(87) PCT Pub. No.: WO2009/149549
PCT Pub. Date: Dec. 17, 2009

(65) Prior Publication Data
US 2011/0093254 A1    Apr. 21, 2011

Related U.S. Application Data

(60) Provisional application No. 61/129,179, filed on Jun. 9, 2008.

(51) Int. Cl.
*G06F 17/28*    (2006.01)
(52) U.S. Cl.
USPC ........................................ 704/2; 704/3; 704/4
(58) Field of Classification Search
USPC ......................................................... 704/2–8
See application file for complete search history.

(56) References Cited

U.S. PATENT DOCUMENTS

| | | | |
|---|---|---|---|
| 5,867,811 A * | 2/1999 | O'Donoghue | 704/1 |
| 6,085,162 A * | 7/2000 | Cherny | 704/277 |
| 6,182,026 B1 * | 1/2001 | Tillmann et al. | 704/2 |
| 6,195,631 B1 * | 2/2001 | Alshawi et al. | 704/4 |
| 6,236,958 B1 * | 5/2001 | Lange et al. | 704/8 |
| 6,937,974 B1 * | 8/2005 | d'Agostini | 704/2 |
| 7,031,911 B2 * | 4/2006 | Zhou et al. | 704/10 |
| 2003/0101044 A1 | 5/2003 | Krasnov | |
| 2008/0133218 A1 | 6/2008 | Zhou et al. | |

OTHER PUBLICATIONS

Brown et al., "The Mathematics of Statistical Machine Translation: Parameter Estimation", Computational Linguistics, vol. 19(2), p. 263-312, 1993.
Church et al., "Robust Bilingual Word Alignment for Machine Aided Translation", p. 1-8, 1993.
Fossum et al., "Using Syntax to Improve Word Alignment Precision for Syntax-Based Machine Translation", Proceedings of the Third Workshop on Statistical Machine Translation, p. 44-52, 2008.
Foster et al., "Target-Text Mediated Interactive Machine Translation", Machine Translation, vol. 12, p. 175-194, 1997.

(Continued)

*Primary Examiner* — Jesse Pullias
(74) *Attorney, Agent, or Firm* — Jason Davis

(57) ABSTRACT

This application is related to a means and a method for facilitating the use of translation memories by aligning words of an input source language sentence with the correspondent translated words in target language sentence. More specifically, this invention relates to such a means and method where there is an enhanced translation memory comprising an alignment function.

6 Claims, 9 Drawing Sheets

(56) References Cited

OTHER PUBLICATIONS

Goodman, J., "A Bit of Progress in Language Modeling Extended Version", Microsoft Research Technical Report, p. 1-72, 2001.

Huet et al., "TS3: an Improved Version of the Bilingual Concordancer TransSearch", EAMT 2009: Proceedings of the 13th Annual Conference of the European Association for Machine Translation, 2009.

Koehn et al., "Statistical Phrase-Based Translation", Proceedings of the North American Chapter of the Association for Computational Linguistics, p. 127-133, 2003.

Marcu et al., "A Phrase-Based Joint Probability Model for Statistical Machine Translation", Empirical Methods in Natural Language Processing, 2002.

Melamed, I., "Automatic Detection of Omissions in Translations", 16th International Conference on Computational Linguistics, 1996.

Moore R., "A Discriminative Framework for Bilingual Word Alignment", Proceedings of Human Language Technology Conference and Conference on Empirical Methods in Natural Language Processing (HLT/EMNLP), p. 81-88, 2005.

Russell, G., "Errors of Omission in Translation", 8th International Conference on Theoretical and Methodological Issues in Machine Translation, 1999.

Simard M., "Translation Spotting for Translation Memories", Building and Using Parallel Texts: Data Driven Machine Translation and Beyond, HLT-NAACL, p. 65-72, 2003.

Tiedemann et al., "Identifying Idiomatic Expressions Using Automatic Word-Alignment", EACL-2006, 11th Conference of the European Chapter of the Association for Computational Linguistics; Proceedings of the Workshop on Multi-word-Expressions in a Multilingual Context, p. 33-40, 2006.

\* cited by examiner

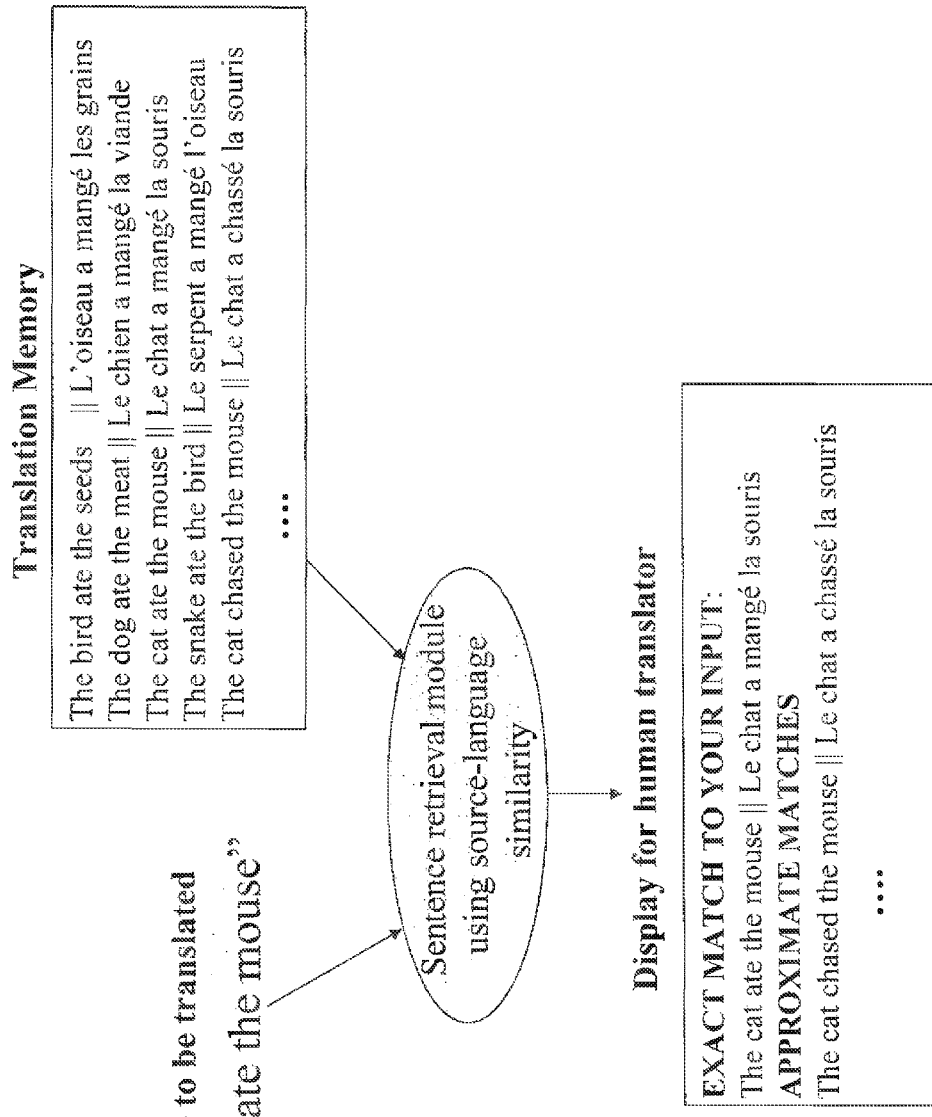

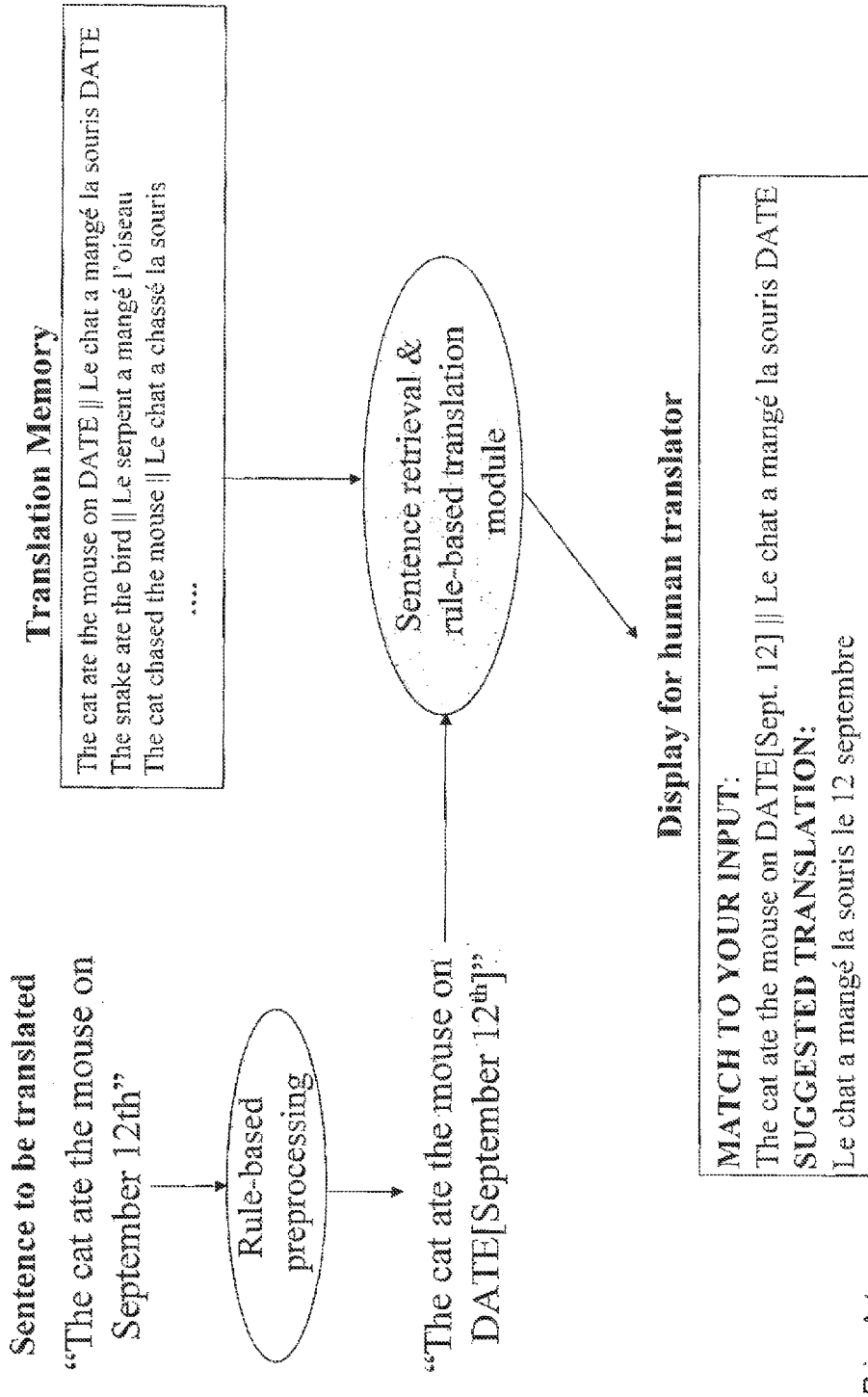

Fig. 3: Translation Generation Constrained on Either or Both Sid
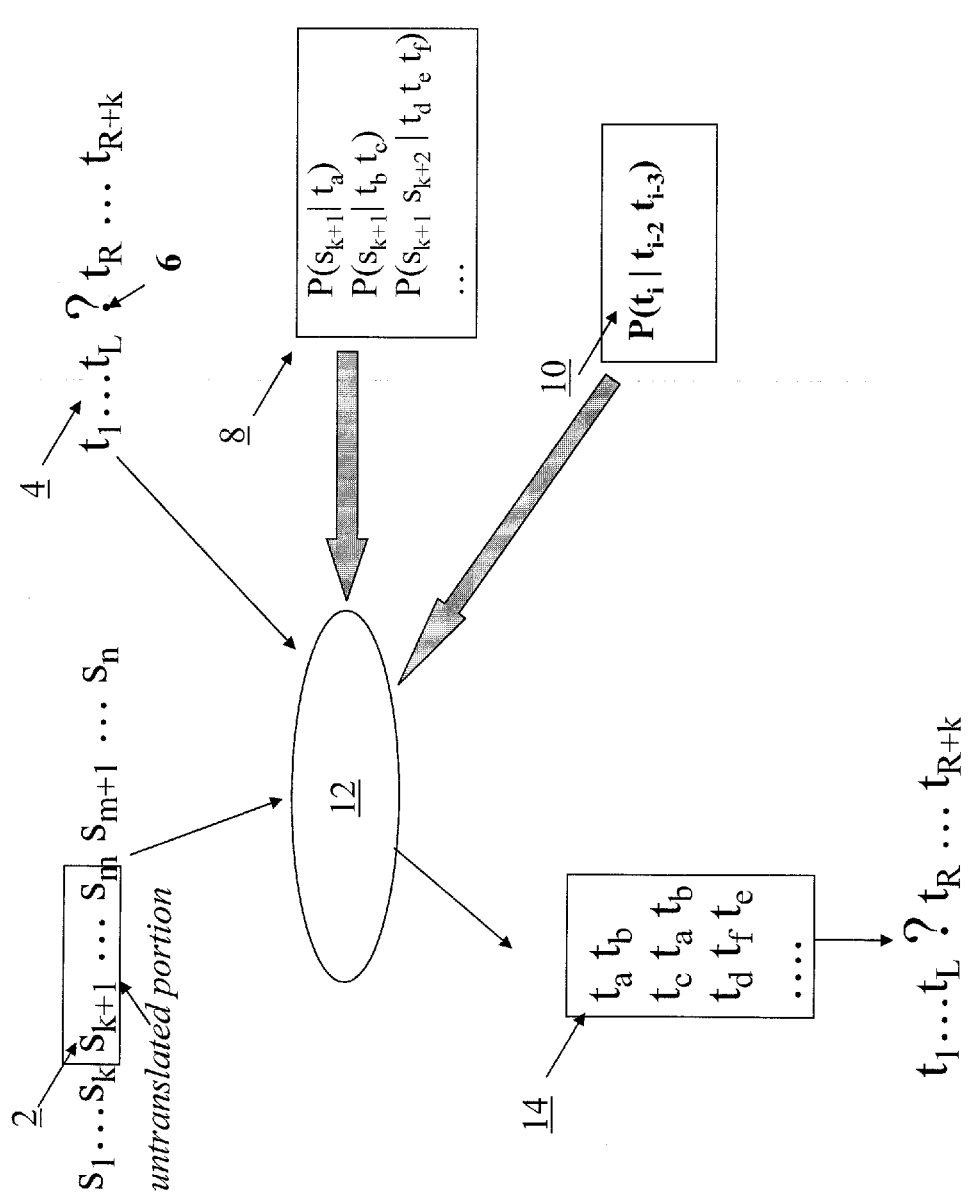

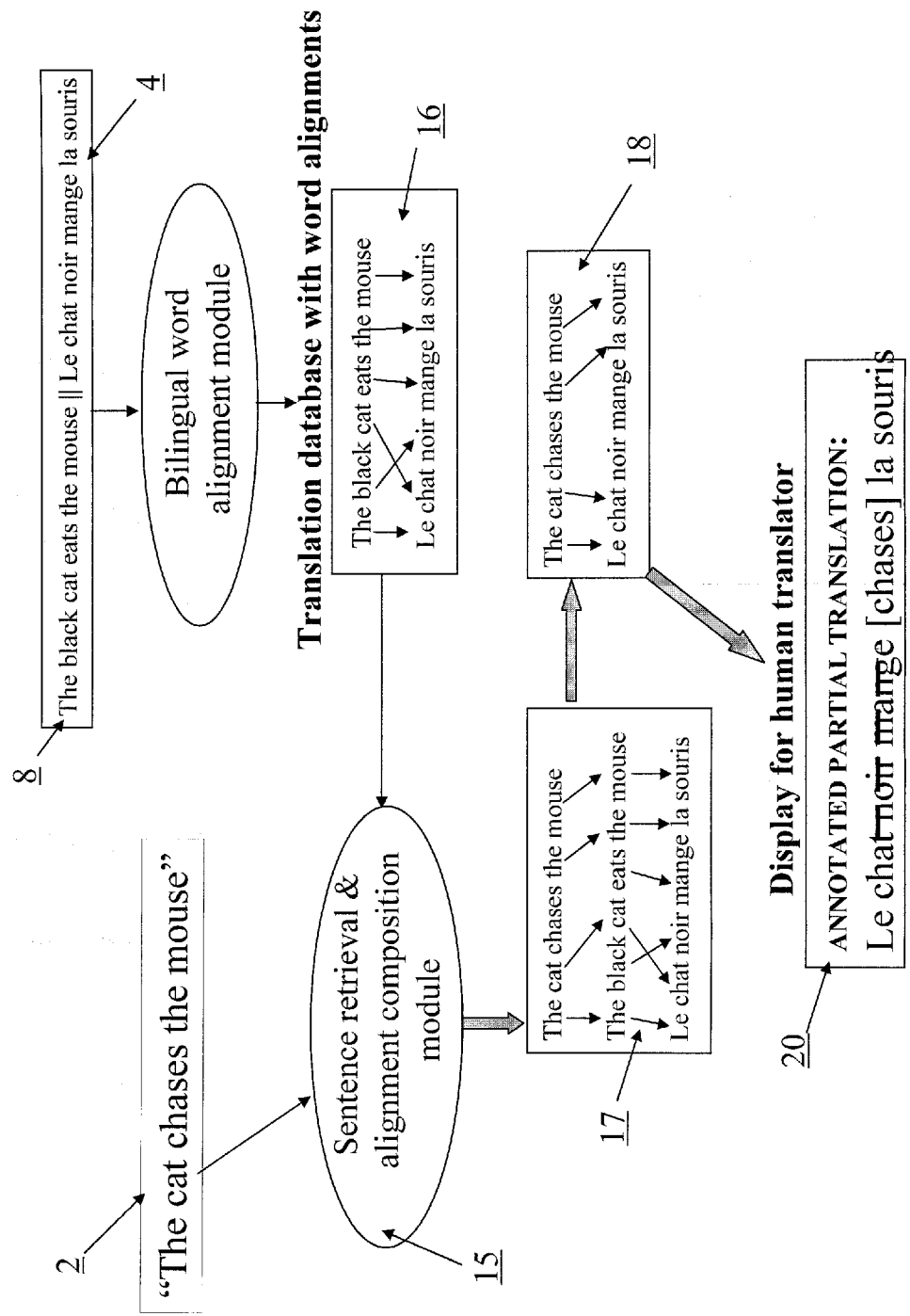

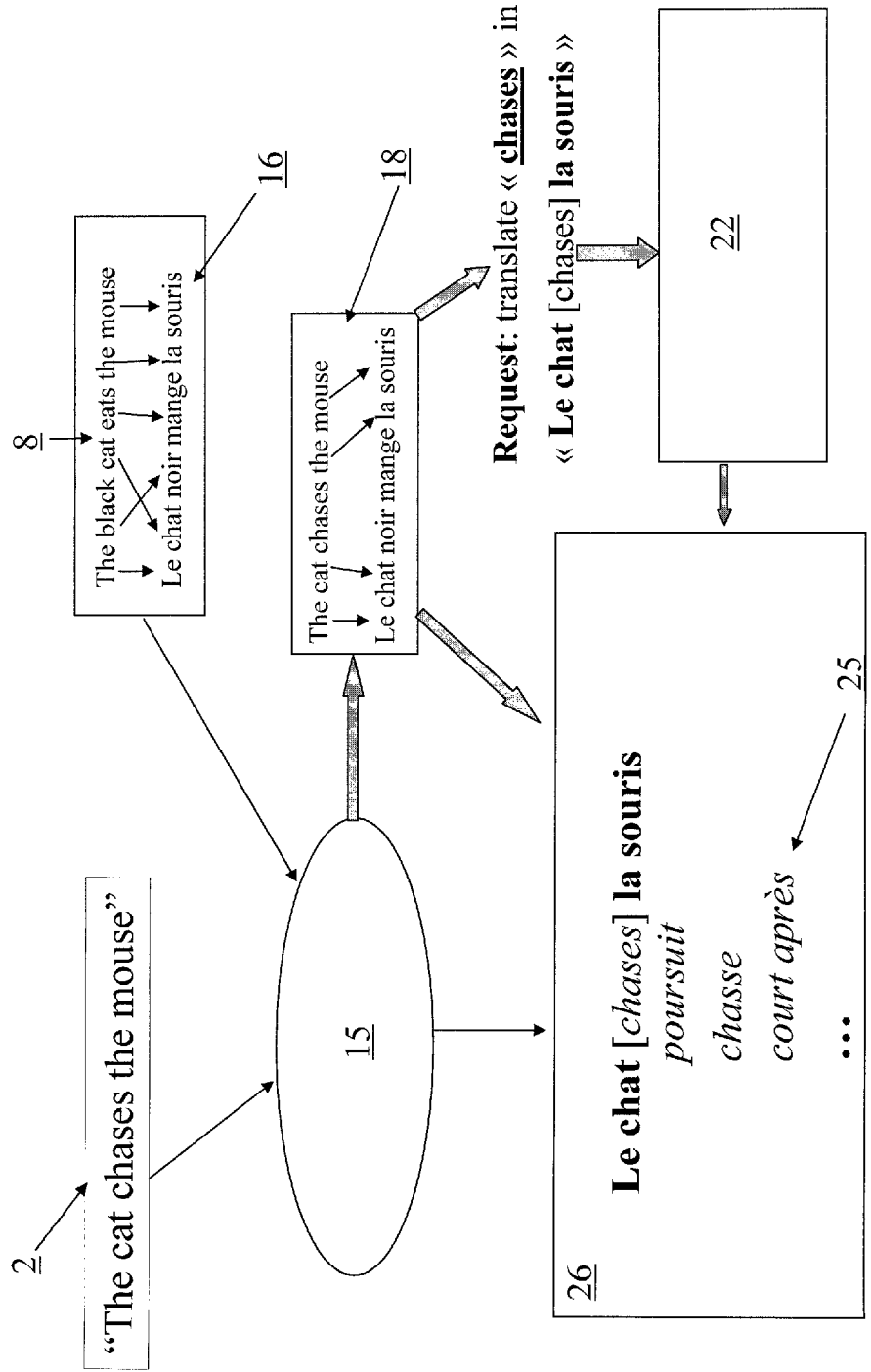
Fig. 5: Enhanced TM – Subsentential Translation Functionality
(Part of Translation comes from TM)

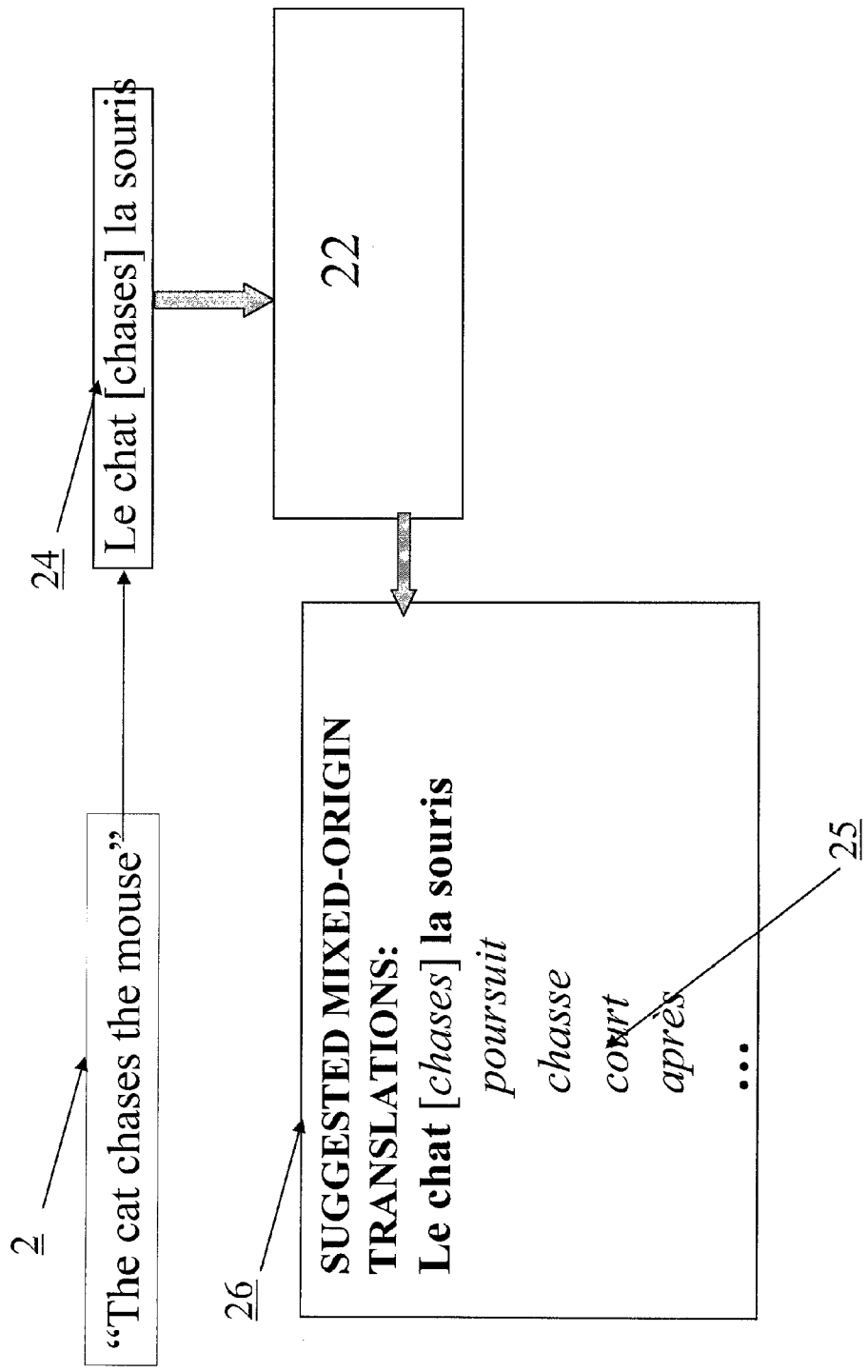
Fig. 6: Enhanced TM – Subsentential Translation Functionality (Part of Translation comes from User)

Fig. 7: Finding a Matching Region
A. User Specifies Region In Source Text
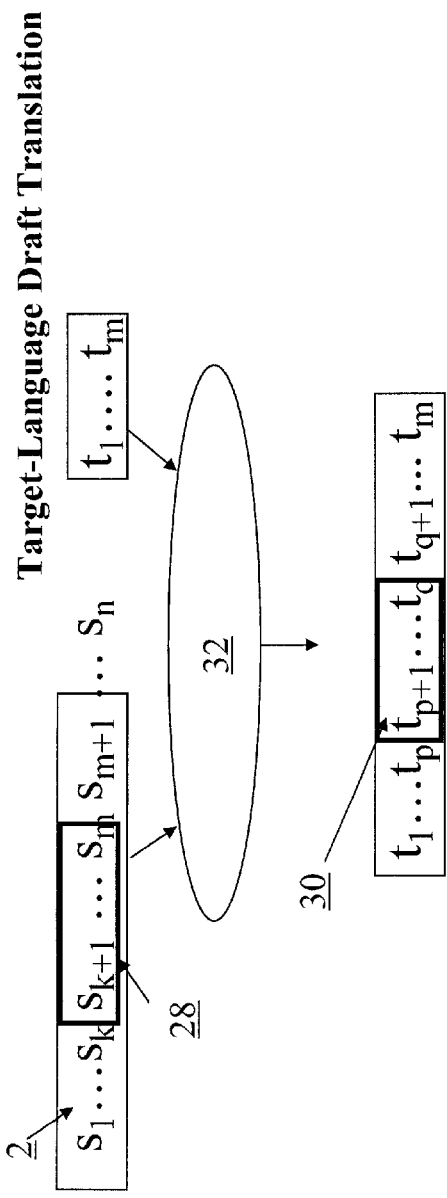
B. User Specifies Region In Target Text
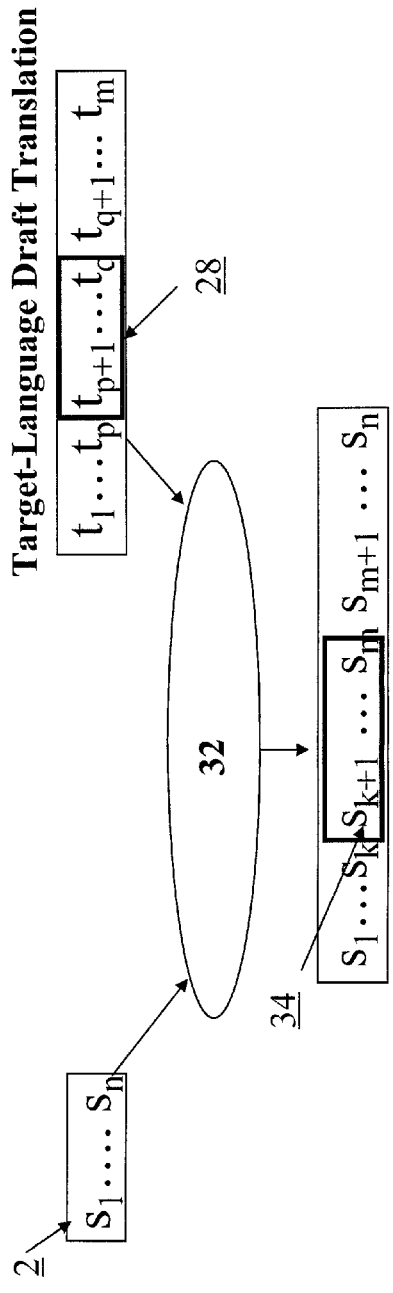

Fig. 8: Finding a Missing or Unmatched Region of Translation
A. Draft Translation Omits Region In Source Text
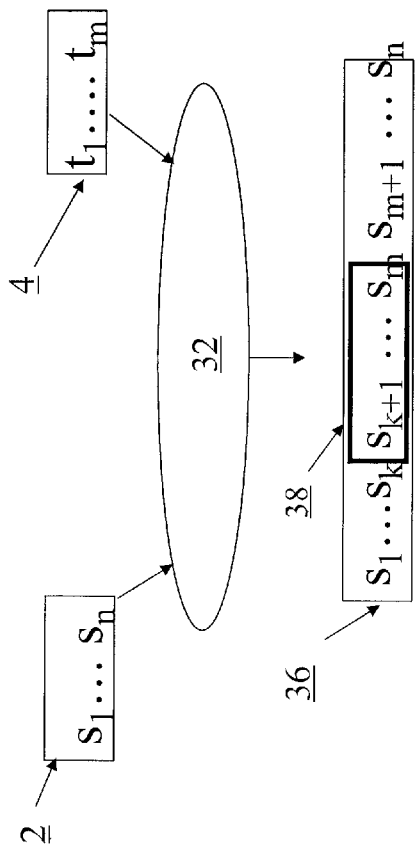
B. Draft Translation Contains Extraneous Material
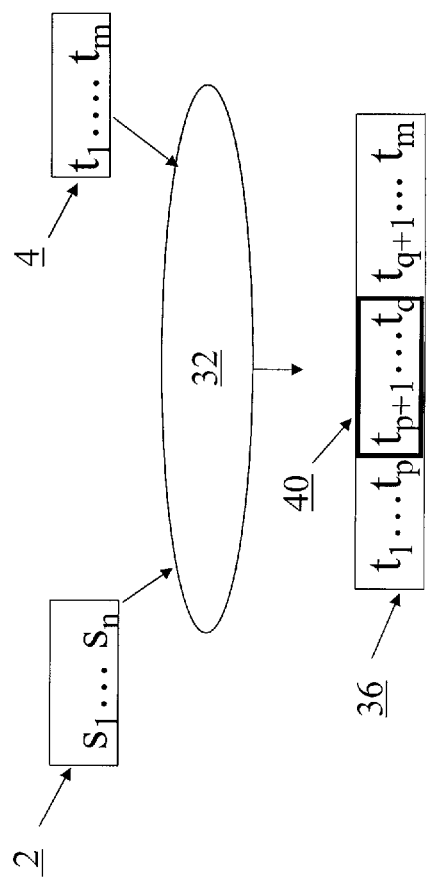

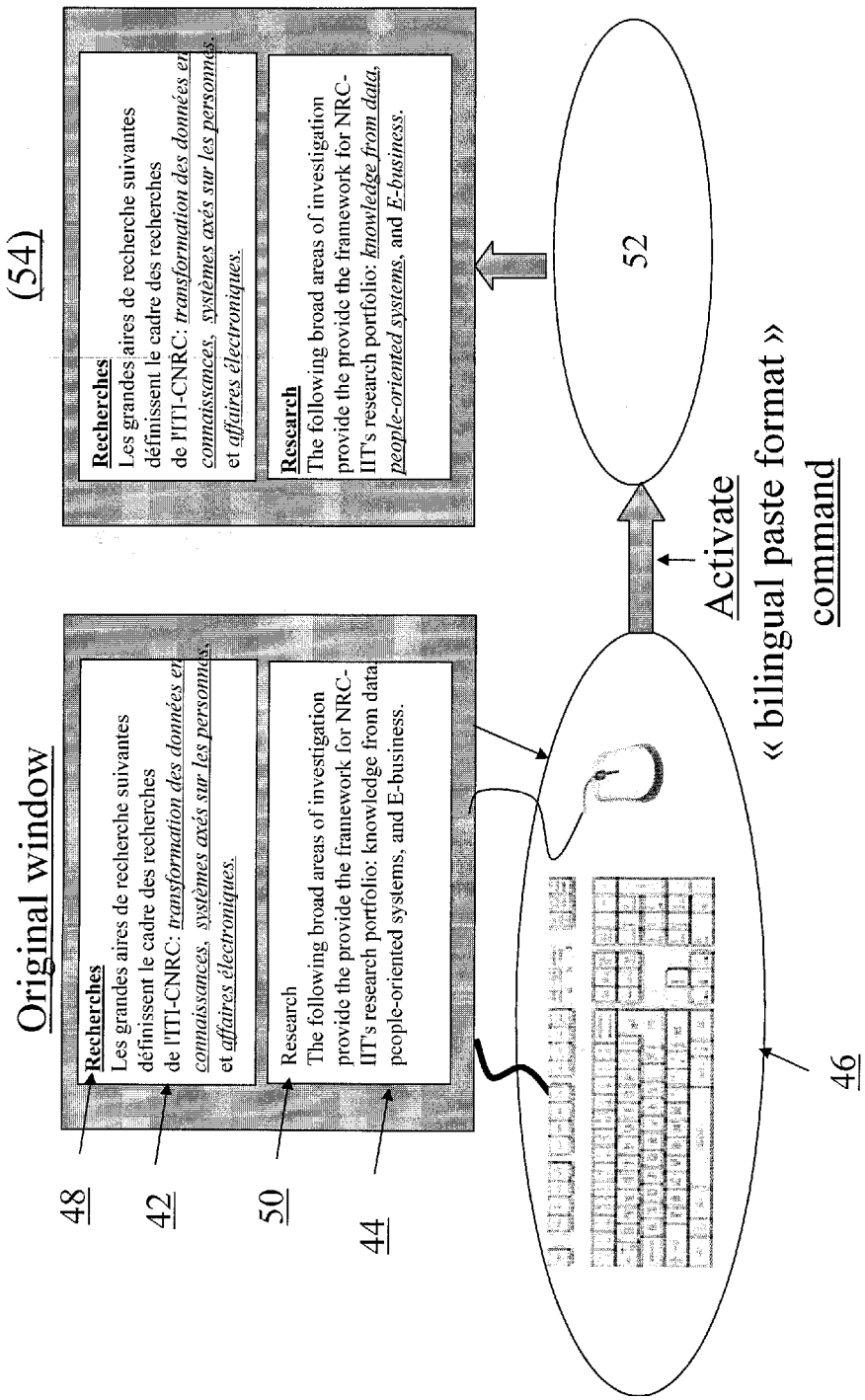

US 8,594,992 B2

METHOD AND SYSTEM FOR USING ALIGNMENT MEANS IN MATCHING TRANSLATION

The present application is a national entry of International Patent Application PCT/CA2009/000810 filed Jun. 9, 2009 and is related to U.S. provisional patent application Ser. No. 61/129,179, filed Jun. 9, 2008.

FIELD OF THE INVENTION

This application is related to a means and a method for aligning one or more than one word of a source language sentence with their one or more than one translated word in target language sentence. More specifically, this invention relates to such a means and method where there is an enhanced translation memory comprising an alignment function.

BACKGROUND OF THE INVENTION

Many human translators already use a translation memory (TM) to increase their productivity. A TM contains a database and a sentence pair retrieval module. The database consists of a large number of bilingual sentence pairs, each consisting of a source-language sentence and its translation into the target language sentence; sometimes the database also includes information about which documents the sentence pairs were extracted from. These sentence pairs often come from earlier translations carried out by translators working for the same organization or company, or by the same individual translator; they may also come from the client for whom the translation is being performed. Suppose, for instance, that a translator wants to translate the English sentence "The cat ate the mouse" into French with the help of the TM. FIG. 1 (prior art) shows this situation. The translator requests that the TM's retrieval module search for the source-language sentence to be translated. In the example, the TM is successful in finding an exact match to "The cat ate the mouse" and displays to the translator the information that this sentence was previously translated as "Le chat a mangé la souris". The translator may then decide to follow this suggestion and translate the sentence the same way as in the example retrieved from the TM's database, or decide on another translation. Even if he or she chooses to produce a different translation, having a previously-translated example to look at often helps productivity (for instance, the retrieved example may remind the translator how to translate some rare words in the input sentence).

Some TMs may display information even if an exact match to the source-language sentence is unavailable, by showing one or more "fuzzy matches" to this input sentence. This situation is also displayed in FIG. 1 (prior art). Here, the TM has displayed a source-language sentence that is quite similar to the input sentence to be translated, "The cat chased the mouse". Information about how sentences that are similar to the input sentence were translated in the past can also be very useful to translators, providing them with much of the vocabulary and syntax they need to translate the input sentence.

In order to support the capabilities of disclosed TM shown in FIG. 1 (prior art), a numerical measure of similarity between the input and the retrieved sentences written in the source language is employed. One such measure is the number of words or characters that must be deleted, substituted or inserted to transform the input sentence into the source-language sentences stored in the TM. For instance, if we compare the input sentence "The cat ate the mouse" with the sentences shown to be stored in the TM at the top of FIG. 1, we see that it takes 2 substitutions to turn this sentence into "The bird ate the seeds", 2 substitutions to turn it into "The dog ate the meat", 2 substitutions to turn it into "The snake ate the bird", but only 1 substitution to turn it into "The cat chased the mouse". Thus, if the sentence retrieval module uses the number of words that must be deleted, substituted or inserted to go from the input sentence to a sentence in the TM as its source-language similarity measure, it will display "The cat chased the mouse" in preference to the other non-identical sentences shown, when the user requests a display of fuzzy matches. Different conventional TMs use different kinds of similarity measures between sentences in the source language—for instance, the similarity measure may incorporate syntactic or structural information.

Thus, disclosed TM contain sentence pairs each consisting of a source-language sentence and its target-language translation. When the user enters a new input source-language sentence, the system retrieves sentence pairs whose retrieved source-language member is identical to or similar to this input source-language sentence, using a numerical measure involving words in the source language only. No numerical measure relating words in the source language to words in the target language is employed Some disclosed TMs have an additional capability, shown in FIG. 2 (prior art). Such TMs contain rules enabling them to recognize and even translate certain specialized entities such as dates and numbers. For instance, suppose that at some point a translator translated the sentence "The cat ate the mouse on March $1^{st}$" as "Le chat a mangé la souris le premier mars" and stored this sentence pair in one of these more advanced conventional TMs. Because of the rules enabling it to recognize dates in English and in French, the system stores the sentence pair as an instance of the general pattern "The cat ate the mouse on DATE||Le chat a mangé la souris DATE". At some future date, when a translator asks for help with the new input sentence "The cat ate the mouse on September 12th", the TM recognizes this as a general instance of the pattern "The cat ate the mouse on DATE" whose DATE component has the value "September $12^{th}$". It uses a specialized rule to translate this into "le 12 septembre" and then uses this string of words to replace the symbol "DATE" in the target-language side of the matching pattern. Thus, it will display to the user the suggested translation "Le chat a mangé la souris le 12 septembre". Again, note that no numerical measure relating words in the source language to words in the target language is employed.

Neither of these embodiment use numerical measures measuring the strength of association between the words in the input source language sentence and words in the retrieved target language sentence.

It is an object of the invention to use numerical measures measuring the strength of association between words in both the input source language sentence and words in the retrieved target language sentence.

It is a further object of the invention to provide a translation alignment means between the input source language sentence and the retrieved target language sentence as part of an enhanced translation memory.

SUMMARY OF THE INVENTION

There is herein comprised an embodiment of the invention comprising a method for aligning one or more than one word of a source language sentence with the words of one or more than one word of the target language sentence, comprising the following steps:

a. obtaining an input source language sentence,
b. comparing said input source language sentence to one or more than one stored source language sentence stored in a memory comprising bilingual sentence pairs,
c. matching said input source language sentence with an entire retrieved source language sentence that resembles said input source language sentence based on numerical measure of similarities,
d. retrieving from an enhanced translation memory said entire retrieved source language sentence and an associated entire retrieved target language sentence, and alignment information about said words in said retrieved source language sentence and words in said retrieved target language sentence,
e. creating a partial unilingual source language alignment by aligning one or more than one word of said input source language sentence with corresponding one or more than one word of said entire retrieved source language sentence,
f. creating a partial bilingual alignment by translating the one or more than one word of said input source language sentence with the corresponding one or more than one word of said associated retrieved target language sentence, using the alignment information retrieved in step d, leaving any non aligned word in the input source language source sentence and the entire retrieved target language sentence unchanged,
g. displaying a result.

There is herein comprised another embodiment of the invention comprising a method for displaying an ongoing translation using an enhanced translation memory having an alignment means comprising the steps:
a. obtaining an input source language sentence:
b. obtaining a partial suggested translation language sentence;
c. aligning said input source language sentence with said partial suggested translation sentence;
d. highlighting one or more than one non-aligned word in said partial suggested translation sentence;
e. displaying said partial suggested translation sentence with highlighted one or more than one non-aligned word in said source language.
f. inputting said one or more than one non-aligned word into a translation generation component;
g. outputting a suggested mixed-origin translation comprising the partial suggested translation sentence and more than one translation option for the one or more than one-non aligned word.

There is herein comprised another embodiment of the invention comprising a method for displaying an ongoing translation using an enhanced translation memory having an alignment means comprising the steps:
a. obtaining an input source language sentence of more than one word;
b. each word having associated formatting information;
c. obtaining a target language translation sentence which resembles said input source language sentence of more than one word;
d. aligning one or more than one word of said input source language sentence with said corresponding word of the target language translation sentence;
e. automatically applying said formatting information of said one or more than one word of said input source language sentence to said corresponding word of the target language sentence;
f. displaying said target language translation sentence in the same format as the input source language sentence.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 1 (prior art) illustrates one embodiment of a Translation Memory (TM).

FIG. 2 (prior art) illustrates one embodiment of a Translation Memory (TM) with Rule Based translation.

FIG. 3 illustrates one embodiment of a translation generation constrained on either or both sides.

FIG. 4 illustrates one embodiment of an Enhanced Translation Memory (ETM).

FIG. 5 illustrates another embodiment of an Enhanced Translation Memory (ETM).

FIG. 6 Illustrates yet another embodiment of an Enhanced Translation Memory (ETM).

FIG. 7 Illustrates one embodiment of a method for finding a Matching Region.

FIG. 8 Illustrates one embodiment of a use of alignment.

FIG. 9 Illustrates yet another embodiment of an Enhanced Translation memory.

DESCRIPTION OF PREFERRED EMBODIMENTS

The Enhanced Translation Memory (ETM) of one embodiment of the invention differs from existing TMs in that it uses numerical measures measuring the strength of associations between words in the source language sentence and words in the target language sentence.

Some of the bilingual strength-of-association measures defined in the statistical machine translation literature estimate the conditional probability that a given target-language word will occur in the target-language member of a bilingual sentence pair, given the occurrence of a particular source-language word in the source-language member of the pair, and vice versa. For instance, the paper "The Mathematics of Statistical Machine Translation: Parameter Estimation" (P. Brown et al., *Computational Linguistics*, June 1993, V. 19, no. 2, pp. 263-312) describes five different ways of estimating such conditional probabilities from a large corpus of bilingual sentence pairs. Each of these ways is associated with a particular mathematical model; these five models are now often collectively referred to as the "IBM models" in the technical literature. The basic idea underlying this work is quite simple: if, in such a large bilingual corpus, the word "lait" occurs much more frequently than chance would predict in the French member of a sentence pair in cases where the English member of the pair contains the word "milk", then the conditional probability of occurrence of "lait" in the French member given the occurrence of "milk" in the English is high. In other words, "milk" and "lait" have a strong bilingual association.

More recent work on so-called "phrase-based" machine translation has focused on cases where a group of words in one language predicts a group of words in the other. For instance, the occurrence of "dead end" in the English member of a bilingual English-French sentence pair increases the estimated probability that "cul de sac" will occur in the French member of the pair, and vice versa. Two slightly different forms of phrase-based machine translation are described in "A Phrase-Based, Joint Probability Model for Statistical Machine Translation" (D. Marcu and W. Wong in *Empirical Methods in Natural Language Processing,* 2002) and in "Statistical Phrase-Based Translation" (P. Koehn, F.-J. Och, and D. Marcu in *Proceedings of the North American Chapter of the Association for Computational Linguistics,* 2003, pp. 127-133). Note that all this work involves estimating the strength of the association between source-language words or word sequences on the one hand and target-language words or word sequences on the other hand; typically, the numerical parameters measuring the strengths of these bilingual associations are estimated on a large bilingual sentence-aligned corpus ahead of time. Subsequently, once these associations have been learned, i.e. they are exploited to carry out translation of arbitrary sentences in the source language to the target language.

The papers just cited show how given a bilingual numerical measure reflecting the strength of association between words in the source language and words in the target language in a "phrase-based" machine translation, such that the measure reflects to some extent how good a translation the latter are of the former, it is possible to attain two important capabilities:

1. aligning the words in a source-language word sequence S and a target-language word sequence T. Alignment is the action of identifying particularly strong bilingual links between individual words in S on the one hand and individual words in T on the other hand. In many cases, one can build on the alignments of individual words to construct alignments between regions that are subsequences of S and T. For instance, given a subsequence subS of S, a system can often automatically identify the corresponding subsequence subT of T. This is done by analyzing bilingual links between the source text S and the target text T: it will often be possible to find a region in the target text that has strong links to the region of interest in the source text and no links, or only weak links, to other regions of the source text. The same operation can be carried out in reverse: given a subsequence subT of T, the system finds the corresponding subsequence subS of S. We will call this capability of finding alignments between individual words or regions in the source-language sequence and individual words or regions in a target-language sequence the "translation alignment" capability means.

2. taking a given source-language word sequence S as input and generating one or more target-language word sequences $T_1$, $T_2$, etc. such that $T_1$, $T_2$, etc. are possible translations of S (with probability greater than chance). We will call this the "translation generation" capability; it is carried out by a specialized search engine.

With respect to the translation generation capability, note that the sequence S of words to be translated may be a sentence, several sentences, or a subsequence of a sentence. In the case where it is a subsequence of a sentence, the translation generation capability can be constrained by specifying the target-language sequences that occur on one or both sides of the insertion point; the translation of the S portion will take into account those surrounding portions. FIG. 3 illustrates this situation. Here, part of the input source-language sentence (2) (the words from $s_1$ to $s_k$ and again from $s_{m+1}$ to $s_n$) has already been translated, but the words from $s_{k+1}$ to $s_m$ remain untranslated. On the target-language side (4), an insertion point (6) for possible translations of these untranslated words is specified. Drawing on knowledge found in a database of bilingual sentence pairs (8), and also on a so-called language model (10) for the target language, a search engine (12) finds sequences of target-language words that are suitable candidates (14) to be translations of the previously untranslated portion of the input source-language sentence (2).

In the figure, the database of bilingual sentence pairs (8) is a phrase table: a list of bilingual phrase pairs, each bilingual phrase pair consisting of a source-language word sequence, a target-language word sequence, and a conditional probability estimate representing the probability of occurrence of the former given the occurrence of the latter. The target language model is an N-gram statistical language model (see Joshua Goodman, "A Bit of Progress in Language Modeling", Microsoft Research Technical Report, August 2001) which makes it possible to estimate the probability of occurrence of a target-language word sequence given the sequence of preceding target-language words. In the situation shown in FIG. 3, the search engine (12) can carry out a kind of search. The search engine (12) consults the phrase table to determine target-language word sequences T that are legitimate translations of the untranslated source-language words. The product of the associated conditional probabilities from the phrase table may be used as a kind of phrase table score for a particular hypothesis for T. This can be combined with a language model score obtained by calculating the probability (according to target language model LM) of the entire sequence of target-language words with T substituted in at the insertion point, $P_{LM}(t_1 \ldots t_L \, T \, t_R \ldots t_{R+k})$. For instance, in a particular case where the untranslated source-language words are $s_7 \, s_8 \, s_9$ and the phrase table lists $P(s_7|t_a)$ and $P(s_8 \, s_9|t_b \, t_c \, t_d)$, the phrase table score for $T=t_a \, t_b \, t_c \, t_d$ would be $P(s_7|t_a)*P(s_8 \, s_9|t_b \, t_c \, t_d)$ and the language model score would be $P_{LM}(t_1 \ldots t_L \, t_a \, t_b \, t_c \, t_d \, t_R \ldots t_{R+k})$. These scores may be combined with other measures of translation quality in a multiplicative or loglinear combination as described in the technical literature on phrase-based translation, yielding a global score for each hypothesis T; the search engine then outputs the hypotheses T that have the best global scores. Although the figure shows a phrase-based embodiment of constrained translation generation, constrained translation generation could also be based on IBM statistical translation models, syntax-informed statistical translation models, or other kinds of statistical translation models.

As noted above, disclosed TMs use unilingual similarity measures to find previously translated source-language sentences that resemble the input source-language sentence to be translated. The use of a bilingual association measure in a TM makes possible new subsentential TM functionalities that enhance translator productivity. The parameters of the bilingual association measure used by the ETM will be estimated on a large collection of previous translations; these could be, for instance, translations between the two relevant languages done earlier by the same company, organization, or individual human translator. Clearly, the most obvious and relevant source of data is the contents of the translation memory itself.

FIG. 4 shows one embodiment of the invention comprising the ETM. This embodiment is based on the translation alignment capability. This capability is applied to the ETM's database of bilingual sentence pairs (8) (previously translated sentences) to yield word-aligned bilingual sentence pairs. When the user of the ETM inputs an input source-language sentence, the ETM retrieves a bilingual sentence pairs (16) whose source-language portion resembles the input sentence, just as in already disclosed TM. However, the sentence retrieval and alignment composition module (15) then carries out an operation that has no equivalent in the conventional TM: it composes a partial, unilingual source-language alignment between the input source-language sentence (2) and a retrieved source-language sentence with the bilingual alignment (shown in step 17) for that retrieved sentence to obtain a partial bilingual alignment between the input sentence and a retrieved target-language sentence (18). It then displays this newly obtained partial bilingual alignment in an annotated partial translation that shows subsentential information. Note that the partial, unilingual source-language alignment aligns two sentences (the input source-language sentence and the retrieved target-language sentence) that are not necessarily semantically identical; in some cases, this alignment may take into account structural or syntactic information.

In FIG. 4, as in FIG. 1 and FIG. 2, the user inputs the input source-language sentence to be translated, "The cat chases the mouse" and the ETM has retrieved the most similar retrieved source-language sentence in its database, "The black cat eats the mouse". The latter was originally translated as "Le chat noir mange la souris". However, instead of just displaying the sentence pair "The black cat eats the mouse∥Le chat noir mange la souris" the ETM displays an annotated version of "Le chat noir mange la souris" in which the irrelevant words "noir" and "mange" are crossed out, and the portion of the original English sentence which has not been translated ("chases") is inserted in the appropriate place. This display format is called the "annotated partial translation" (20). In many cases, it will be desirable to display as part of the annotated partial translation a confidence level indicating the system's assessment of the relevance of the annotated partial translation; it is possible that different parts of the retrieved target-language sequence displayed will be shown with different confidence levels. If the system cannot generate an annotated partial translation with sufficiently high confidence, it may decide not to display any annotated partial translation; in other cases, if more than one annotated partial translation has high confidence, it may decide to display more than one.

Note that in the alignment between the input sentence and the retrieved target-language sentence (18), there may be words in the input source-language sentence that don't align with anything in the stored target-language sentence ("chases" in the FIG. 4 example) and there may be words in the stored target-language sentence that don't align with anything in the input sentence ("noir mange" in the FIG. 4 example). Both kinds of non-aligned words are shown to the user in the ETM's display, so that he or she understands what elements of the input sentence aren't present in the retrieved target-language example, and what elements of the retrieved target-language example are irrelevant for the translation of the input sentence.

FIG. 5 and FIG. 6 illustrate another embodiment of the invention comprising an ETM, one that uses both the translation alignment capability and the translation generation capability. Both figures show a suggested translation for a input source-language sentence (2) which comes from different origins; in both, one part of the translation comes from the translation generation component (22). In FIG. 5, the other parts of the translation come from the translation memory, while in FIG. 6, the other human translations (24) come from the human user. In both cases, confidence levels may be shown; confidence scores may be used to decide which possible translations should be displayed (if any), and how many should be displayed.

In FIG. 5, the user has requested that the system suggest a translation for the input source language sentence (2) "The cat chases the mouse", using both the already disclosed TM capability and the added translation generation capability. In the suggested translation, the portion of the translated sentence that comes from the TM is indicated in bold (23). The non-aligned words of the input source-language sentence are shown in brackets and italics; several possible translations of the non-aligned words suggested by the translation generation component (22) are shown in italics (25). On FIG. 5 this is illustrated as a mixed origin translation (26). As was explained above, the translation generation capability can be invoked in a mode where part of the translation has been specified. It's possible that some of the suggested translations of the unmatched input words will not be reasonable ones. However, since the human translator can ignore unhelpful suggestions, the occasional bad translation doesn't matter.

FIG. 5 illustrates just one possible way in which the ETM can show the user which information comes from the TM and which comes from the translation generation component. This information could be displayed to the user in many other ways, not shown in the figure. For instance, the user could highlight the portions of the input sentence he wishes suggested translations for, and the suggested translations would appear in different colours depending on whether they came from the TM component or from the translation generation component.

The diagram in FIG. 5 suggests that target segments "le chat" and "la souris" were extracted directly from the translation memory, while the proposals for the missing source-language part "chases" were produced independently by the translation generation component. Recall, however, that the target-language segments from the translation memory are also utilized by the translation generation component, as contextual clues for generating a proper translation for the missing segment (see FIG. 3). In practice, there are alternative ways of jointly utilizing the translation memory and translation generation components in such a way as to produce a similar kind of output. For example, instead of using the translation generation component only to translate the missing segment "chases", we could translate the entire input source-language sentence (2) with this component, and use the translation memory output to bias its behavior. This could be achieved, for instance, by artificially boosting the bilingual word associations of the target-language segments found in the translation memory ("le chat" and "la souris"), or by favoring those generated translations that more closely resemble the retrieved target-language sentence from the translation memory ("Le chat noir mange la souris").

FIG. 6 illustrates another embodiment of the invention which is similar to that of FIG. 5, except that the pre-specified portion of the translation comes from the human user instead of from the translation memory. Here, the user has translated most of the sentence "The cat chases the mouse", but has not translated the word "chases"; the translation generation component (22) suggests some alternative translations for this missing part of the translation. FIG. 6 omits some steps shown in FIG. 5, such as the way in which the stored word-aligned sentence pairs are obtained. The article "Target-Text Mediated Interactive Machine Translation" by G. Foster, P. Isabelle, and P. Plamondon (Machine Translation V. 12, pp. 175-194, 1997) describes a more limited functionality related to this, in which the system completes the current word, going rightwards from the first few letters of the word typed by the current user.

It is clear that the functionality shown in FIG. 6 is very helpful to professional translators: it lets them specify most of a translated sentence, while letting the system give suggestions for parts of the sentence they are not sure of. Another way in which this functionality could be invoked is not shown in the figure: the translator translates the entire sentence but then indicates (on the target side) a portion of the translation he or she is uncertain of, requesting the ETM to propose alternatives. Finally, a human translator may choose to request one or more translations of the entire current sentence from the translation generation component (22).

Note that the display mechanism for the portion of the translation supplied by the translation generation component may use colours, shading, or numerical values to indicate different degrees of confidence in the alternate translations supplied. Note also that the ETM can handle the combination of the cases shown in FIG. 5 and FIG. 6: that is, there may be suggested mixed-origin translations (26) where part of the translation comes from the translation memory, part is specified by the user, and part comes from the translation generation component.

FIG. 7 shows another embodiment of the invention using the translation alignment capability in the ETM that is useful once a retrieved target-language translation T of the input source-language sentence (2) S has been obtained (possibly from the translation memory). This functionality enables the translator to identify matching text segments quickly. For instance, the translator may highlight a region (28) in the source with his mouse, and the corresponding region in the target-language draft translation will be highlighted (30) by using the sentence region alignment (32). The same capability would be available in reverse, allowing the translator to highlight a portion of the draft translation and have the invention identify for him the portion of the source text (34) of which it is a translation. Both operations are shown in FIG. 7.

FIG. 8 shows another embodiment of the invention comprising the application of the translation alignment capability in the ETM that is useful once a target-language sentence translation (4) T of the input source-language sentence (2) S has been obtained. This functionality allows the system to show the user regions of the source sentence that do not have corresponding regions in the draft translation (38), and thus still require translation; it also allows the system to show the user unmatched regions in the draft translation (40), that is, extraneous material that should not be included in the final translation. By indicating these two types of mismatch, the ETM facilitates quality control by the human translator. This kind of quality control is especially important when the draft translation (36) T has been retrieved from the translation memory's database, since the chances of omitted or extraneous material are quite high in this case. There is some related prior art in this area: the papers by Dan Melamed, "Automatic Detection of Omissions in Translation" in 16$^{th}$ *International Conference on Computational Linguistics,* 1996 and Graham Russell, "Errors of Omission in Translation" in *Eighth International Conference on Theoretical and Methodological Issues in Machine Translation,* 1999 both discuss automatic detection of some types of translation errors. However, neither of these authors proposes the use of such detection as one of the functionalities of a translation memory, as is the case here. Note that because they enforce a sentence alignment, translation memories tend to guarantee that each source sentence will be linked to one target sentence and vice versa; however, they provide no guarantees with respect to sentence-internal correspondences.

Another, related functionality can be used to display the translator's progress in translating the current sentence. For instance, the system may display the source sentence currently being translated in one window, allowing the translator to enter his translation in a second window; as the translator enters more and more words of the draft translation, more and more words of the source sentence are shown as being "crossed off". Alternatively, different colours or fonts could be used to show which portions of the source sentence have already been translated and which still need to be translated.

FIG. 9 shows another way in which the translation alignment capability is used by the ETM to support a functionality that enhances the productivity of a human translator. Here, there are two windows appearing on the screen of the translator's workstation—the upper window, source window (42), shows part of the source text in the source language (French), the lower window, target window (44), shows the corresponding part of the draft translation in the target language (English). The translator is entering information into the target window (44) using an input device (46) such as a keyboard, while consulting the source window (42). Of course, the functionality can be employed with any number of windows, and user interfaces other than those shown; this figure merely illustrates the concept.

In an ideal world, the translator would be entirely focused on the translation task itself, rather than on extraneous issues such as file formats. In real life, many professional translators must struggle with a variety of electronic file formats. Typically, the client delivers an electronic source-language document to the translator in a particular proprietary or non-proprietary file format (e.g., Microsoft Word, WordPerfect, HTML, Portable Document Format ("pdf"), etc.), and expects the translation into the target language to be delivered in the same file format. The source document often contains graphics, figures, tables, etc., that should be reproduced in the translation. However, there is no guarantee that the translator himself is comfortable in the client's file format; the translator might prefer to work in another file format if given the choice.

Thus, real-life translators often find themselves entering their target-language translations into a file in the client's preferred format, without having much expertise with the latter. In FIG. 9, note that the source document contains special formatting of certain words: the title "Recherches" (48) is displayed in bold type, is underlined, and has a different font size from the other words; the sentence under this heading contains three items that are in italics and underlined. In the partial translation draft, the title "Research" (50) in the target window (44) is formatted in the same way as all other words, and there are no bullet points or italics in any part of the text. In this example, the translator has chosen to enter unformatted target-language translation text first, and then apply formatting commands later. If he is not skilled in the formatting commands for the client's file format, this will be quite time-consuming; there is also the risk that the translator will overlook some of the formatting that needs to be done.

An alternative approach adopted by many translators is sometimes called "translation by deletion". Here, the translator types over a copy of the source text, inheriting the relevant formats. In this approach, the English word "Research" would be typed over the French word "Recherches", causing the English word to inherit the properties of the French word that it overwrites (bold type, underlined property, font size). Similarly, the words "knowledge from data", which are a translation of the first underlined, italicized item in the French source, would be typed over these French words "transformation des données en connaissances" and thus inherit the underlining and italics. While "translation by deletion" means that the translator doesn't have to worry about transferring formats from the source text to the target text, it has several disadvantages which reduce the translator's productivity. For instance, with this approach the translator may accidentally delete a larger chunk of source text than is translated, so that some of the information in the original source-language material is omitted from the translation. With this approach, the opposite mistake is also possible: the translator may accidentally leave some of the source-language text in the target translation (this mistake is especially likely if the target and source languages have similar alphabets).

As shown in the figure, the format transfer module (52) functionality of the ETM allows the translator to transfer the formatting of the source-language text to the target-language translation, without incurring the risks associated with translation by deletion. When the user invokes the "bilingual paste format" command on a portion of the source document that has been translated, the format transfer module (52) searches for sequences of words within the text which are tagged with a special format or combination of formats. For each such sequence of words, it finds the corresponding sequence of words in the target-language draft (using the translation alignment capability) and tags it with the corresponding format or combination of formats. This is illustrated in the "window after paste format" (54).

Not shown in the figure is another aspect of the format transfer functionality: it copies non-textual elements of the source document such as illustrations, graphs, tables, captions and spreadsheets over to the appropriate place in the draft translation. Examples of formatting that can be transferred, in addition to those mentioned, include different fonts, character sizes, underline, layout such as single- or multi-level indentation, etc. Note that the format transfer module will not always be capable of transferring all aspects of the source document format to the target-language translation, since some kinds of formatting don't have equivalents in some languages. For instance, in translating an English document to Chinese, the format transfer module would be able to transfer bullet points but not italics, unless italics are defined for Chinese characters.

The format transfer functionality of the ETM transfers a burdensome task from the translator to the ETM, thus improving the translator's productivity. It is especially advantageous in the case where the human translator is dictating the translation to an automatic speech recognition (ASR) system. One of the reasons ASR systems have not replaced typing as an input means for translators is that in practice, documents often contain formatting and inserted elements such as illustrations, graphs, tables, captions and spreadsheets which the translator must manipulate manually, even if he or she has just dictated a translation of the body of the text. The format transfer functionality, when combined with ASR dictation, makes it easier to carry out fully "handsfree" translation.

We claim:

1. A method for aligning one or more than one word of a source language sentence with one or more than one word of a target language sentence, comprising:
   a) obtaining an input source language sentence,
   b) comparing said input source language sentence to one or more than one stored source language sentence stored in a translation memory comprising a database with a large number of bilingual sentence pairs, and a sentence pair retrieval module,
   c) matching said input source language sentence with an entire retrieved source language sentence that resembles said input source language sentence based on a numerical measure of similarity,
   d) retrieving from an enhanced translation memory said entire retrieved source language sentence and an associated entire retrieved target language sentence, and alignment information about words in said retrieved source language sentence and words in said retrieved target language sentence,
   e) creating a partial unilingual source language alignment by aligning one or more than one word of said input source language sentence with a corresponding one or more than one word of said entire retrieved source language sentence,
   f) creating a partial bilingual alignment by aligning the one or more than one word of said input source language sentence with the corresponding one or more than one word of said associated retrieved target language sentence, using the alignment information retrieved in step d), leaving any non-aligned word in the input source language source sentence and the entire retrieved target language sentence unchanged, and
   g) displaying a result.

2. The method of claim 1 where displaying a result comprises displaying the entire retrieved target language sentence highlighting one or more than one non-aligned word in the source language.

3. The method of claim 2 where one or more than one translation option for the non-aligned word in the source language is obtained by a translation generation means.

4. A method for displaying an ongoing translation using an enhanced translation memory having an alignment means, the translation memory having a database with a large number of bilingual sentence pairs, and a sentence pair retrieval module, the method comprising:
   a) obtaining an input source language sentence;
   b) obtaining a partial suggested target language sentence for translation of the input source language sentence from the sentence pair retrieval module;
   c) aligning said input source language sentence with said partial suggested target language sentence to identify bilingual links between source words and target words;
   d) identifying one or more than one non-aligned word in said partial suggested target language sentence;
   e) displaying said partial suggested target language sentence with highlighting of the one or more than one non-aligned word in said source language;
   f) inputting said one or more than one non-aligned word into a translation generation component; and
   g) outputting a suggested mixed-origin translation comprising the partial suggested target language sentence and more than one translation option for the one or more than one-non aligned word.

5. The method of claim 4 where said source language sentence and said partial suggested target language sentence are displayed simultaneously.

6. A method for displaying an ongoing translation using an enhanced translation memory having an alignment means, the translation memory having a database with a large number of bilingual sentence pairs, and a sentence pair retrieval module, the method comprising:
   a) obtaining an input source language sentence of more than one word, each word having associated formatting information with two or more words having different associated formatting information;
   b) obtaining a target language translation sentence which resembles said input source language sentence of more than one word;
   c) aligning one or more than one word of said input source language sentence with said corresponding word of the target language translation sentence;
   d) automatically applying formatting information corresponding to said formatting information of said one or more than one word of said input source language sentence to said corresponding word of the target language sentence so that respective target words aligned with the two or more words have different associated formatting information; and e) displaying said target language translation sentence as formatted.

* * * * *